United States Patent
Conley

(10) Patent No.: US 10,541,981 B1
(45) Date of Patent: *Jan. 21, 2020

(54) SECURE MESSAGE SERVICE FOR MANAGING THIRD-PARTY DISSEMINATION OF SENSITIVE INFORMATION

(71) Applicant: Amazon Technologies, Inc., Seattle, WA (US)

(72) Inventor: Myles Conley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,255

(22) Filed: May 17, 2017

(51) Int. Cl.
*H04L 29/06* (2006.01)
*H04L 12/58* (2006.01)

(52) U.S. Cl.
CPC .......... *H04L 63/0428* (2013.01); *H04L 51/12* (2013.01); *H04L 63/10* (2013.01); *H04L 2209/16* (2013.01)

(58) Field of Classification Search
USPC ....................................................... 718/168
See application file for complete search history.

(56) References Cited

U.S. PATENT DOCUMENTS

| 5,577,040 | A | 11/1996 | Klumpp |
| 7,620,691 | B1 | 11/2009 | Goldman et al. |
| 8,453,040 | B2 | 5/2013 | Henderson, Jr. et al. |
| 8,539,224 | B2 | 9/2013 | Henderson et al. |
| 8,583,912 | B2 | 11/2013 | Ishikawa et al. |
| 8,719,568 | B1 | 5/2014 | Antypas, III |
| 2004/0189699 | A1 | 9/2004 | Dobronsky |
| 2005/0198170 | A1* | 9/2005 | LeMay ................. H04L 63/045 709/206 |
| 2006/0031328 | A1* | 2/2006 | Malik ................. G06Q 10/107 709/206 |
| 2006/0053280 | A1 | 3/2006 | Kittle et al. |
| 2006/0155810 | A1 | 7/2006 | Butcher |
| 2008/0165972 | A1 | 7/2008 | Worthington |
| 2010/0219154 | A1 | 9/2010 | Mooney |

(Continued)

OTHER PUBLICATIONS

Klensin, "Simple Mail Transfer Protocol," Network Working Group, Request for Comments: 5321, Oct. 2008, 96 pages.

(Continued)

*Primary Examiner* — Kambiz Zand
*Assistant Examiner* — Thanh H Le
(74) *Attorney, Agent, or Firm* — Davis Wright Tremaine LLP

(57) ABSTRACT

A message relay service receives, from a third-party mass delivery service, an electronic message that includes an electronic address of an entity and obscured data, where the plaintext data of the obscured data is unattainable by third-party mass delivery service. The message relay service identifies, based at least in part on the entity's electronic address and the obscured data, permissions usable to determine if the entity is authorized to transmit the electronic message. If the entity is authorized to transmit the message, the message relay service de-obscures the obscured data to obtain the plaintext data. The message relay service transmits the electronic message including the plaintext data to a recipient specified in the electronic message.

20 Claims, 8 Drawing Sheets

(56) References Cited

U.S. PATENT DOCUMENTS

| | | |
|---|---|---|
| 2011/0131279 A1 | 6/2011 | Karnik |
| 2012/0023326 A1 | 1/2012 | Kalan et al. |
| 2013/0007448 A1* | 1/2013 | Brown ................. H04L 9/3247 |
| | | 713/157 |
| 2013/0275532 A1 | 10/2013 | Shah et al. |
| 2014/0281493 A1 | 9/2014 | Nakhjiri |
| 2014/0330910 A1 | 11/2014 | Anderson |
| 2014/0337615 A1 | 11/2014 | Tomkow |
| 2015/0149775 A1 | 5/2015 | Gadotti |
| 2016/0248745 A1 | 8/2016 | Tsirkin |
| 2016/0294750 A1 | 10/2016 | Ansari et al. |
| 2017/0359314 A1 | 12/2017 | Mathias et al. |
| 2017/0366478 A1 | 12/2017 | Mohammed et al. |

OTHER PUBLICATIONS

Resnick, Internet Message Format, Network Working Group, Request for Comments: 5322, Oct. 2008, 58 pages.

Yao et al., "SMTP Extension for Internationalized Email," Internet Engineering Task Force, Request for Comments: 6531, Feb. 2012, 18 pages.

\* cited by examiner

US 10,541,981 B1

SECURE MESSAGE SERVICE FOR MANAGING THIRD-PARTY DISSEMINATION OF SENSITIVE INFORMATION

CROSS-REFERENCE TO RELATED APPLICATION

This application incorporates by reference for all purposes the full disclosure of co-pending U.S. patent application Ser. No. 15/375,003, filed Dec. 9, 2016, entitled "SECURE MESSAGE SERVICE FOR PREVENTING DISSEMINATION OF SENSITIVE INFORMATION TO THIRD-PARTIES."

BACKGROUND

Companies and other organizations often rely on third-party mass delivery services to deliver electronic messages to the companies' customers on their behalf. However, these companies and other organizations may not trust these third-party mass delivery services with sensitive information that is to be sent to its customers. Further, regulatory requirements may prevent dissemination of sensitive information to third-parties, making it difficult to utilize third-party mass delivery services to transmit electronic messages that include such sensitive information to customers of these companies and organizations.

These companies and other organizations also often collaborate with other companies to generate electronic messages and other messages that may provide their customers with information that may be useful to these customers. However, these companies may be prohibited from sharing data directly with one another or from sending messages on behalf of other companies, making it difficult to collaborate in creating messages that include all the information needed by customers for their needs. Additionally, coordinating creation of these electronic messages may be difficult and time-intensive.

BRIEF DESCRIPTION OF THE DRAWINGS

Various techniques will be described with reference to the drawings, in which.

DETAILED DESCRIPTION

Figure 1:
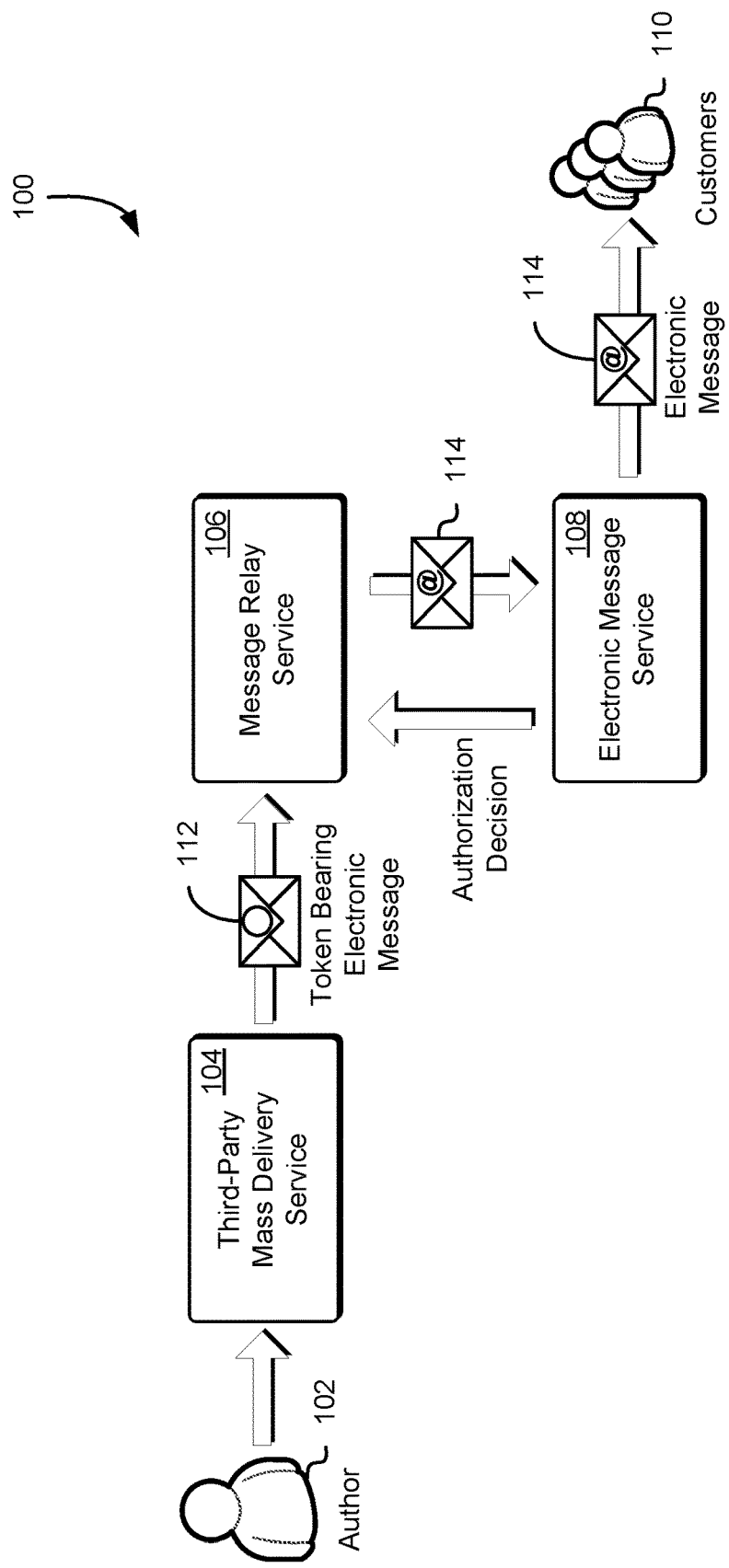
FIG. 1 shows an illustrative example of an environment in which various embodiments can be implemented.

This patent disclosure relates to a message relay service that receives token bearing electronic messages, determines whether authors of the token bearing electronic messages are authorized to transmit electronic messages to the intended destinations, and decodes obscured fields of the token bearing electronic mail messages for delivery to the intended destinations. In an example, a user of a third-party mass delivery service (e.g., an author of electronic messages), wanting to send an electronic message to a variety of customers, generates a token bearing electronic message that includes a token for each customer's electronic address. The token may include an anonymous identifier that is specific to the third-party mass delivery service and is in the form of another electronic message address that causes the electronic message to be directed to an electronic message service that the author may trust with sensitive information or with routing to another service that can handle sensitive information on the author's behalf. Additionally, if the electronic message to be delivered to the variety of customers includes sensitive information that the organization does not want to expose to the third-party mass delivery service, the organization may obfuscate or replace any fields within the electronic message that include sensitive information with another token. This token may include encrypted data in a form that includes metadata that may be used for decryption. Alternatively, this token may include a workflow data element that may specify a lookup number or an Extensible Markup Language (XML) object that may include instructions or other parameters for de-obscuring any obscured fields in the electronic message. The token bearing electronic message generated via the third-party mass delivery service by the author may include the author's electronic address. The token and obscured fields may be similar to those described in U.S. patent application Ser. No. 15/375, 003, which is hereby incorporated in its entirety by reference.

In an example, the third-party mass delivery service transmits, based on the anonymous identifiers specified in the token bearing electronic message, the token bearing electronic message to a message relay service. The message relay service may parse the token bearing electronic message to identify the electronic address of the author that generated the token bearing electronic message. The message relay service may transmit a request to an electronic message service to determine whether the author is authorized to send electronic messages to customers using the electronic address of the author specified in the token bearing electronic message. In an example, the electronic message service utilizes the electronic address of the author to identify the author's permissions for transmitting electronic messages to customers of the author's organization. For instance, the electronic message service may determine whether the author is authorized to transmit electronic messages through the third-party mass delivery service and on behalf of the organization. Additionally, the electronic message service may determine whether the author is authorized to generate an electronic message that has the properties of the token bearing electronic message received by the message relay service (e.g., size, selected customers, content of the electronic message, valid hyperlinks, etc.). In some instances, the electronic message service may monitor the rate at which the author transmits electronic messages via the third-party mass delivery service. Thus, the electronic mail service may determine whether the rate at which the author is sending such messages exceeds a rate limit imposed on the author.

If the electronic mail service determines that the author is authorized to transmit the electronic message to the customers corresponding to the recipient electronic addresses specified in the electronic message, the electronic mail service may transmit a notification to the message relay service to indicate that it is permitted to de-obscure any obscured fields in the token bearing electronic message. In response to the notification, and for each obscured field in the token bearing electronic message, the message relay service may determine whether it is able to de-obscure the obscured fields itself or if another service is required to de-obscure any of the identified fields. If the message relay service determines that it can de-obscure any of the obscured fields in the token bearing electronic message, the message relay service may perform various operations to de-obscure these fields. In some examples, if the token bearing electronic message includes a lookup number or XML object, the message relay service may utilize the lookup number or XML object to identify any instructions or parameters that may specify how to de-obscure any obscured fields in the token bearing electronic message. The methods for de-obscuring any obscured fields in the token bearing electronic message may include transmitting the token bearing electronic message to another service to enable the other service to insert the sensitive information that is to be included in the electronic message or identifying the cryptographic key or algorithm that can be used to decrypt an obscured portion of the token bearing electronic message.

In an example, the message relay service can forward the electronic message via a Simple Mail Transfer Protocol (SMTP) server, such as through the electronic message service, to the electronic addresses of the customers. Alternatively, if a recipient utilizes a different communications protocol, the message relay service may forward the electronic message to a non-SMTP gateway or service based on the protocol utilized by the recipient. As the electronic messages are delivered to the customers by the electronic message service or other service based on the communications protocol utilized by the customer, the electronic message service or other service may confirm delivery of the electronic messages to the third-party mass delivery service, which may track delivery of the electronic messages and provide the originating organization with confirmation that the electronic messages were delivered successfully.

In this manner, an organization may enable employees and other authors to transmit electronic messages on behalf of the organization via a third-party mass delivery service to the organization's customers without exposing sensitive information to the third-party mass delivery service or to any other unauthorized entity. In addition, the techniques described and suggested in this disclosure enable additional technical advantages. For instance, because the message relay service utilizes the author's electronic address specified in the token bearing electronic message to determine whether the author is authorized to transmit the electronic message on the organization's behalf to its customers, the message relay service may prevent unauthorized use of the organization's domain name by the third-party mass delivery service to reach the organization's customers. Further, if unauthorized use of the organization's domain name is detected, the message relay service may notify the organization, which may perform various remedial actions to prevent further unauthorized usage of its domain name by authors.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, an author 102 accesses a third-party mass delivery service 104 to generate one or more token bearing electronic messages 112 for delivery to one or more customers 110 of a service. The author 102 may be an employee of the service, who may be designated by the service to interact with customers of the service to provide information regarding the service (e.g., promotional materials, telemetry data for an item, purchase history, customer identifiers, etc.). In some embodiments, the author 102 may be a service that includes one or more computing systems that may provide organizations and other users of the obfuscation service with resources for generating and distributing electronic messages on their behalf. The customers 110 may be individuals, groups of individuals, or other organizations that may be associated with the author 102 via the author's organization (e.g., service). For example, a customer 110 may be a purchaser of an item furnished by the organization, whereby the organization may periodically transmit tailored electronic messages that may be specific to the customer 110.

In an embodiment, the author 102 utilizes a message template provided by the third-party mass delivery service 104 to generate one or more electronic messages that are to be delivered to one or more customers 110. An electronic message may include an electronic address for the intended recipient. This electronic message address may include an identifier for the name of an electronic mailbox, which may be the username of the recipient that is to receive the electronic message. Additionally, the electronic message address may specify a domain name that represents an administrative realm for the mailbox. This may correspond to the electronic message service or server utilized by the recipient to access its electronic messages. In some embodiments, the one or more electronic messages further include an electronic address for the author 102. This electronic address may similarly include the name of an electronic mailbox, which may be the username of the author 102 that is providing the electronic message to the customers 110. The author's electronic message address may further specify a domain name that corresponds to the author's organization. Thus, a customer receiving an electronic message with the author's electronic message address may identify the author 102 and the organization to which the author 102 belongs. Electronic messages that may be generated through the third-party mass delivery service 104 include: electronic mail messages, Short Message Service (SMS) messages, Multimedia Messaging Service (MMS) messages, text messages, and other forms of messages that may be delivered electronically.

In an embodiment, the author's organization provides, to the third-party mass delivery service 104, token bearing data that may be inserted into the message template provided by the third-party mass delivery service 104 to the author 102 for generating an electronic message. For instance, the author's organization may provide token bearing data that may be stored within a token bearing data repository of the third-party mass delivery service 104 for use by the author 102 in generating the electronic message through an interface of the third-party mass delivery service 104. The token bearing data may include encrypted data in a form that includes metadata that may be used for decryption of the encrypted data. The metadata may specify the name of the cryptographic key or cryptographic algorithm that may be used to decrypt the encrypted data. This cryptographic key or algorithm may be available to another service utilized by the organization, such as a token conversion service or decryption service described in greater detail in relation with FIG. 4. Thus, if a token conversion service or decryption service receives the electronic message comprising an obscured field that specifies encrypted data, the token conversion service or decryption service may use the metadata specified in the electronic message to determine which cryptographic key or algorithm to use to decrypt the obscured field. In some embodiments, the metadata may further include one or more characters that may be used by the author 102 to identify at least some of the content of the token bearing data without the ability to decrypt or otherwise de-obscure the token bearing data. For instance, the metadata may specify an identifier that the author may query via a lookup table provided by the author's organization to identify the characteristics of the token bearing data. As an illustrative example, if the token bearing data includes encrypted electronic addresses for customers in a particular geographic region, the metadata for the token bearing data may specify an identifier usable by the author 102 to query a lookup table to determine that the token bearing data includes electronic addresses of customers within the particular geographic region while preventing the author 102 from discerning the electronic addresses of each customer in the particular geographic region. Through an interface provided by the third-party mass delivery service 104, the author 102 may select the appropriate token bearing data for insertion into the electronic message.

In some instances, the author 102 may obtain the token bearing data directly from the author's organization, which the author 102 may transmit to the third-party mass delivery service 104 for inclusion in the electronic message. For instance, the author 102 may transmit data to the author's organization, which may obscure the data to produce the token bearing data. The author's organization may provide the token bearing data to the author 102 to fulfill the request to obscure the data. Alternatively, the author 102 may submit a request to the author's organization to obtain data having a particular characteristic (e.g., electronic addresses of customers in a geographic area, sensitive customer information, etc.). In response to the request, the author's organization may provide token bearing data that includes, in obscured form, the requested data.

The author's organization, in some embodiments, generates a workflow data element that is added to the electronic message. The workflow data element may include a lookup number that may be used by a message relay service 106 to identify any operations that are to be performed to de-obscure any obscured elements of the electronic message. For instance, if the electronic message includes encrypted data, the lookup number may refer the message relay service 106 to one or more instructions or parameters that may cause the message relay service 106 to transmit the electronic message to a token conversion service or decryption service for decryption of the encrypted data. The instructions or parameters may be provided to the message relay service 106 by the author's organization or may be encoded by the message relay service 106 in a database, whereby the encoded instructions or parameters may be associated with a particular lookup number that is provided to the author's organization. The author's organization may provide this lookup number to the author 102, which may include the lookup number in the electronic message. The workflow data element may alternatively include an XML object or other code expressed in a programmatic language that may specify the one or more instructions or parameters that can be used by the message relay service 106. For instance, the message relay service 106 may parse the electronic message to identify the XML object. If the message relay service 106 identifies an XML object in the electronic message, the message relay service 106 may use the XML object to identify any other tokens in the electronic message and to determine where to route these tokens for resolution. The XML object may also include credential information that the message relay service 106 may use to access the author's organization to obtain a digital certificate, shared secret, or other token sufficient for verifying that the obscured field is authentic and that the plaintext data of the obscured field can be disseminated to the next recipient of the electronic message.

If the author 102 has completed generating the electronic message that is to be delivered to one or more customers 110 of the author's organization, the author 102 may transmit a request to the third-party mass delivery service 104 to transmit the token bearing electronic message 112 to the message relay service 106. The token bearing electronic message 112 may include one or more tokens that may obscure the sensitive information in the electronic message. Each of the one or more tokens may include encrypted data, XML objects, lookup numbers, or other information that may not be decipherable by the message relay service 106 to obtain the sensitive information, as described above. In an embodiment, the author 102 substitutes a token for the electronic addresses of the customers 110 to whom the electronic message is addressed. This token may be formatted in a similar fashion to a standard electronic message address except that the electronic message may be addressed to the message relay service 106. The token bearing electronic message 112 may also specify the author's electronic address in plaintext format as well as other information associated with the author's organization that may be provided in plaintext format.

In response to receiving the token bearing electronic message 112 from the third-party mass delivery service 104, the message relay service 106 may parse the data in the token bearing electronic message 112 to identify any token bearing or encrypted fields within the token bearing electronic message 112. Additionally, the message relay service 106 may identify the author's electronic address and any other plaintext information specified in the token bearing electronic message 112. In an embodiment, the message relay service 106 transmits a request to an electronic message service 108 to determine whether the author 102 is authorized to transmit the electronic message to the one or more customers 110. In the request, the message relay service 106 may provide the author's electronic address, any tokens included in the token bearing electronic message 112, any plaintext elements specified in the token bearing electronic message 112, and/or the token bearing electronic message 112 itself. In some instances, the message relay service 106 may further provide additional details regarding the token bearing electronic message 112, such as the size of the token bearing electronic message 112 and a timestamp corresponding to a time at which the token bearing electronic message 112 was received by the message relay service 106.

The electronic message service 108 may include one or more SMTP servers or other mail servers that may facilitate routing and delivery of electronic messages to customers 110, other services, or other entities based at least in part on the address specified in the electronic message. In an embodiment, the message relay service 106 evaluates the delivery token specified in the token bearing electronic message 112 to determine the electronic address of the electronic message service 108. The message relay service 106 may transmit the request to determine whether the author 102 is authorized to transmit the electronic message to the one or more customers 110 to the electronic address of the electronic message service 108.

In response to the request from the message relay service 106, the electronic message service 108 may query a permissions database to identify an entry corresponding to the electronic address or other identifier specified in the electronic address of the author 102. If there is no entry corresponding to the author 102, the electronic message service 108 may determine that the author 102 is not authorized to transmit the electronic message on behalf of the author's organization. As a result of this determination, the electronic message service 108 may transmit a notification to the message relay service 106 to indicate that the token bearing electronic message 112 is to be rejected. Alternatively, if the electronic message service 108 identifies an entry corresponding to the identifier of the author 102, the electronic message service 108 may obtain any permissions associated with the author 102 to determine whether the author 102 is authorized to transmit the electronic message to the intended customers 110. In some embodiments, the message relay service 106 evaluates metadata of the tokens included in the token bearing electronic message 112 to identify permissions usable to determine whether the author 102 is authorized to transmit the electronic message. In other embodiments, the message relay service 106 obtains permissions based at least in part on the domain name specified in the electronic address of the author 102 specified in the token bearing electronic message 112.

In some embodiments, the token bearing electronic message 112 includes a token corresponding to the author of the token bearing electronic message 112. This token may be used to identify the permissions usable to determine whether the author 102 is authorized to relay the electronic message to customers and other recipients. Further, in some instances, the token may include a workflow data element that may be used to replace specified recipient electronic addresses with other electronic addresses. As an example, the token may be used to identify a mapping of recipient electronic addresses specified in the token bearing electronic message 112 to the actual electronic addresses of the intended recipients.

The permissions specified in the permissions database may be provided by the author's organization and may specify any rules regarding an author's ability to transmit electronic messages on behalf of the author's organization. For instance, a permission may specify that the author 102 is not authorized to transmit electronic messages on behalf of the author's organization. Alternatively, a permission may specify that the author 102 may transmit a limited number of unique electronic messages to customers 110 over a period of time. In some instances, a permission may specify a limitation on the size of the electronic message to be transmitted to customers 110 of the author's organization. Additional permissions may specify a period during which the author 102 may transmit electronic messages on behalf of the author's organization, an employment status of the author 102 within the author's organization, an Internet Protocol (IP) address range for the author 102, limitations on the content that can be included in the electronic messages, and the like. The electronic message service 108 may provide these permissions to the message relay service 106 to fulfill the request to determine whether the author 102 is authorized to transmit the electronic message to the one or more customers 110. Alternatively, if the electronic message service 108 is able to determine whether the author 102 is authorized to transmit the electronic message on behalf of the author's organization based at least in part on the information provided in the request from the message relay service 106, the electronic message service 108 may provide the authorization decision to the message relay service 106.

In some embodiments, the authorization decision is provided to the message relay service 106 in asynchronously. For instance, the electronic message service 108 may provide, to the message relay service 106, one or more notifications regarding the author that may be used to determine whether the author 102 is authorized to transmit electronic messages on behalf of the author's organization. This may include information specifying whether the author 102 has been compromised or if one or more permissions regarding the author 102 have been updated since the last electronic message transmitted by the author 102 on behalf of the author's organization. Further, it should be noted that while the present disclosure illustrates that the authorization decision may originate from the electronic message service 108, the authorization decision may be made by the message relay service 106 itself, whereby the electronic message service 108 may trust the authorization decision made by the message relay service 106 or may require the message relay service 106 to provide authentication information that can be used by the electronic message service 108 to verify that the message relay service 106 has successfully determined that the author is authorized to transmit the electronic message on behalf of the author's organization.

If the electronic message service 108 indicates, in its response to the message relay service 106, that the author 102 is not authorized to transmit the electronic message to the one or more customers 110, the message relay service 106 may reject the token bearing electronic message 112. Additionally, the message relay service 106 may transmit a notification to the author 102 or to author's organization to indicate that the electronic message could not be delivered. However, if the response from the electronic message service 108 indicates that the author 102 is authorized to transmit the electronic message to the one or more customers 110 or includes the one or more permissions applicable to the token bearing electronic message 112, the message relay service may evaluate the token bearing electronic message 112 for any metadata indicating presence of an obscured field within the token bearing electronic message 112 that is to be de-obscured by the message relay service. Based at least in part on the tokens identified in the token bearing electronic message 112, the message relay service may identify any tokens that can be de-obscured by the message relay service.

If the message relay service 106 is unable to de-obscure a token within the token bearing electronic message 112, the message relay service 106 may identify a remote service that may be capable of de-obscuring the token. For instance, the token may specify, in its metadata, the tools required to de-obscure the token. This may include the name of a cryptographic key utilized for encryption of obscured field, the name of a service that is authorized to de-obscure the obscured field, instructions for transmitting the obscured field to another service, and the like. Based at least in part on this metadata for a token in the token bearing electronic message 112, the message relay service 106 may transmit the token bearing electronic message 112 to another service that is capable of de-obscuring the obscured field in the token bearing electronic message 112. Once the other service has de-obscured any remaining tokens in the token bearing electronic message 112, the other service may query the message relay service 106 by providing the token representing the recipient's address to the message relay service 106. In response to the query, the message relay service 106 may provide an electronic message address corresponding to the intended recipient and the one or more permissions provided by the electronic message service 108. This may cause the other service to determine whether the author 102 is authorized to transmit the electronic message and, if so, may deliver the electronic message 114 to the intended recipient.

In some embodiments, if the message relay service is able to de-obscure the tokens in a token bearing electronic message 112, the message relay service will replace the token representing the recipients' addresses with the actual recipients' addresses. The message relay service may evaluate the de-obscured tokens against the permissions provided by the electronic message service 108 to determine whether the author 102 is authorized to transmit the electronic message 114. If the author 102 is not authorized to transmit the electronic message 114 to the customers 110, the message relay service 106 may reject the electronic message 114 and transmit a notification to the author 102 or to the author's organization to indicate that the electronic message 114 has been rejected. However, if the author 102 is authorized to transmit the electronic message 114 to the one or more customers 110, the message relay service 106 may forward the message via the electronic message service 108 to the recipients' addresses specified in the electronic message 114. In this manner, the customers 110 of the organization may receive the full electronic message 114 from the electronic message service 108. In an embodiment, the electronic message service 108 tracks delivery of the electronic messages 114 to the customers 110 to determine whether each electronic message 114 is delivered successfully. Confirmation of delivery of the electronic messages 114 may be transmitted by the electronic message service 108 to the third-party mass delivery service 104, which may track success of the delivery of the electronic messages 114 to the customers 110. The third-party mass delivery service 104 may provide this information to the author 102 or to the author's organization, which may use the information to determine the success of its campaign to deliver these electronic messages 114. In some instances, if the electronic message is not delivered successfully, the electronic message service 108 transmits delivery state information to the third-party mass delivery service 104 indicating that the electronic message 114 was not delivered successfully. Thus, the electronic message service 108 may provide delivery state information to the third-party mass delivery service 104 based at least in part on the result of attempting to deliver the electronic message 114 to the specified recipient.

Figure 2:
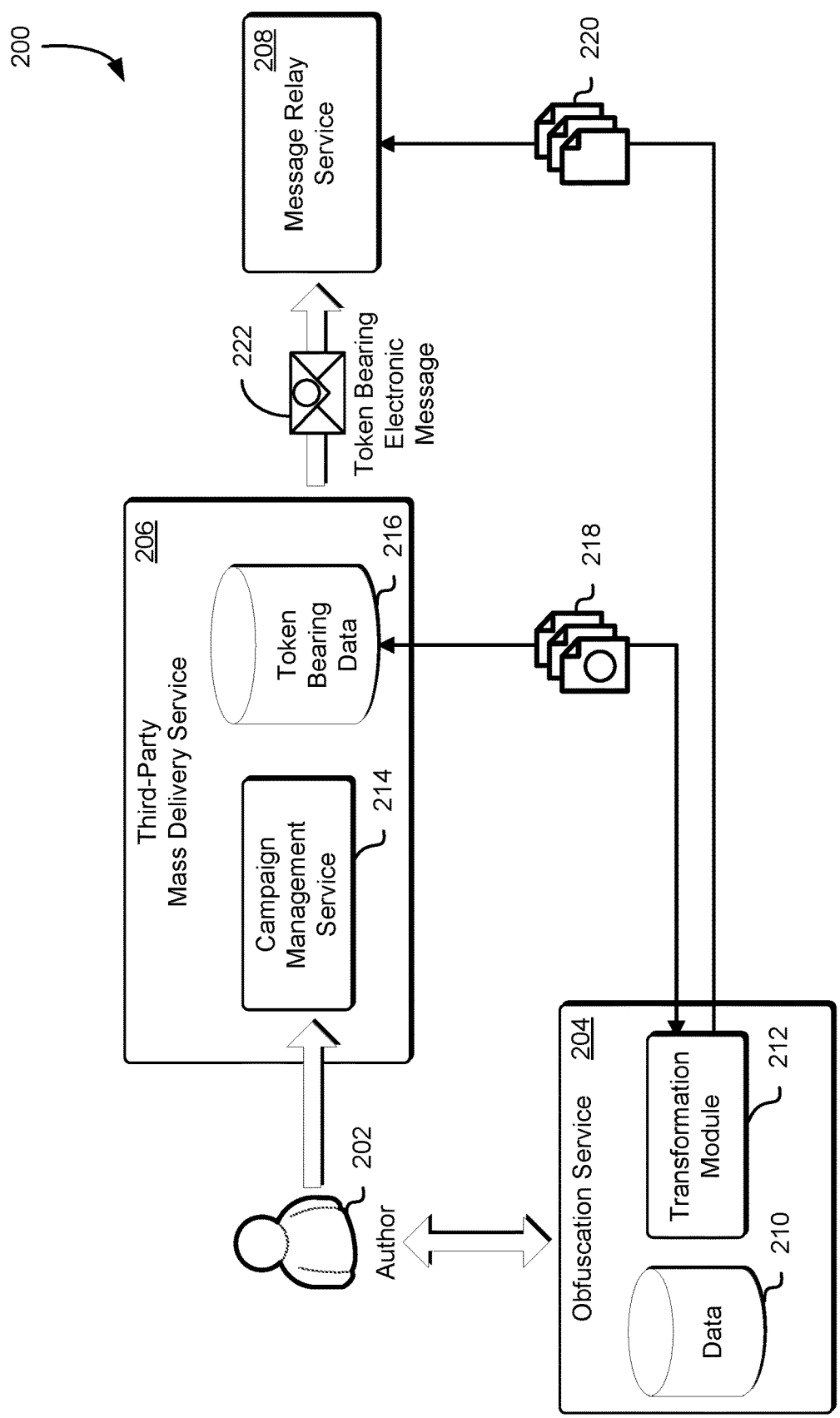
FIG. 2 shows an illustrative example of an environment in which a message relay service obtains data from an obfuscation service for de-obscuring one or more obscured fields in a token bearing electronic message in accordance with at least one embodiment.

As noted above, an author may access a third-party mass delivery service to generate one or more electronic messages for delivery to customers of an author's organization, such as an obfuscation service. The author may include, in the electronic messages, one or more obscured fields that the third-party mass delivery service may be unable to de-obscure. The third-party mass delivery service may transmit the token bearing electronic message generated by the author to a message relay service, which may de-obscure the obscured fields and determine whether the author is authorized to transmit the electronic messages to customers of the obfuscation service on behalf of the obfuscation service. Accordingly, FIG. 2 shows an illustrative example of an environment 200 in which a message relay service 208 obtains data 220 from an obfuscation service 204 for de-obscuring one or more obscured fields in a token bearing electronic message 222 in accordance with at least one embodiment.

In the environment 200, an author 202 accesses a campaign management service 214 of a third-party mass delivery service 206 to generate an electronic message that is to be delivered to one or more customers of a obfuscation service 204. The author 202 may be an employee of the obfuscation service 204 or may otherwise have an association with the obfuscation service 204 whereby the author 202 may perform one or more actions on behalf of the obfuscation service 204. The campaign management service 214 may include one or more computer systems of the third-party mass delivery service 206 that may provide users of the third-party mass delivery service 206 with access to various electronic message templates for generating electronic messages for delivery to various customers. Additionally, the campaign management service 214 may track success of the delivery of the electronic messages to the customers. The campaign management service 214 may provide this information to the author 202 or to the obfuscation service 204, which may use the information to determine the success of its campaign to deliver these electronic messages.

The campaign management service 214 may provide the author 202 with a user interface, such as a graphical user interface (GUI), which the author 202 may utilize to select an electronic message template for generating the electronic message. Further, through the user interface, the author 202 may select any data made available to the author 202 for generating the electronic message. For example, in some embodiments, the obfuscation service 204 generates, using a transformation module 212 and data from a data repository 210, token bearing data 218 that may be stored in a token bearing data repository 216 of the third-party mass delivery service 206. The transformation module 212 may include one or more computer systems of the obfuscation service 204 which may perform one or more operations to obscure data from the data repository 210 to generate the token bearing data 218. For example, the transformation module 212 may encrypt data in a form that includes metadata that may be used for decryption of the encrypted data. This metadata may specify the name of the cryptographic key or cryptographic algorithm that may be used to decrypt the encrypted data. This cryptographic key or algorithm may be available to another service utilized by the obfuscation service 204, such as a token conversion service or decryption service. In some embodiments, the metadata may further include one or more characters that may be used by the author 202 to identify at least some of the content of the token bearing data without the ability to decrypt or otherwise de-obscure the token bearing data. The transformation module 212 may also receive the token bearing data 218 from the token bearing data repository 216 for synchronization of the token bearing data 218. That may prevent outdated data from being provided to the author 202 in generating its token bearing electronic message 222, as described below.

In an embodiment, the token bearing data 218 is indexed within the token bearing data repository 216 based at least in part on the organization that provided the token bearing data 218 (e.g., the obfuscation service 204). Thus, the author 202 may identify any token bearing data 218 made available by the obfuscation service 204 to the third-party mass delivery service 206 via the interface provided by the campaign management service 214. For instance, if the token bearing data 218 includes one or more characters for identifying at least some of the content of the token bearing data 218, the author 202 may use these characters to select the token bearing data 218 that is to be included in the electronic message. The author 202 may select any token bearing data 218 made available via the token bearing data repository 216 and insert the token bearing data 218 into the electronic message template. If the author 202 indicates, via the interface, that the electronic message is ready for delivery, the campaign management service 214 may generate, based at least in part on the template generated by the author 202, a token bearing electronic message 222. The campaign management service 214 may transmit the token bearing electronic message 222 to the message relay service 208 for further processing and delivery to the intended customers of the obfuscation service 204.

In response to receiving the token bearing electronic message 222 from the third-party mass delivery service 206, the message relay service 208 may parse the data in the token bearing electronic message 222 to identify any token bearing or encrypted fields within the token bearing electronic message 222. Additionally, the message relay service 208 may identify the author's electronic address and any other plaintext information specified in the token bearing electronic message 222. As noted above, the message relay service 208 may transmit a request to an electronic message service to determine whether the author 202 is authorized to transmit the electronic message to the one or more customers. In the request, the message relay service 208 may provide the author's electronic address, any tokens included in the token bearing electronic message 222, any plaintext elements specified in the token bearing electronic message 222, and/or the token bearing electronic message 222 itself. In some instances, the message relay service 208 may further provide additional details regarding the token bearing electronic message 222, such as the size of the token bearing electronic message 222 and a timestamp corresponding to a time at which the token bearing electronic message 222 was received by the message relay service 208.

In response to the request from the message relay service 208, the electronic message service may query a permissions database to identify an entry corresponding to the electronic address or other identifier specified in the electronic address of the author 202. If there is no entry corresponding to the author 202, the electronic message service may determine that the author 202 is not authorized to transmit the electronic message on behalf of the obfuscation service 204. As a result of this determination, the electronic message service may transmit a notification to the message relay service 208 to indicate that the token bearing electronic message 222 is to be rejected. Alternatively, if the electronic message service identifies an entry corresponding to the identifier of the author 202, the electronic message service may obtain any permissions associated with the author 202 to determine whether the author 202 is authorized to transmit the electronic message to the intended customers. Based at least in part on the information provided by the message relay service 208 and the permissions, the electronic message service may determine whether the author 202 is authorized to transmit the electronic message on behalf of the obfuscation service 204. However, if the permissions require further analysis of the token bearing data specified in the token bearing electronic message 222, the electronic message service may transmit the permissions to the message relay service 208.

As noted above, if the message relay service 208 is unable to de-obscure a token within the token bearing electronic message 222, the message relay service 208 may identify a remote service that may be capable of de-obscuring the token. For instance, the token may specify, in its metadata, the tools required to de-obscure the token. This may include the name of a cryptographic key utilized for encryption of obscured field, the name of a service that is authorized to de-obscure the obscured field, instructions for transmitting the obscured field to another service, and the like. In an embodiment, the metadata of one or more tokens specifies an electronic address of the obfuscation service 204. The message relay service 208 may transmit the token bearing data 218 specified in the token bearing electronic message 222 to the obfuscation service 204. The obfuscation service 204 may use the transformation module 212 to de-obscure the token bearing data 218 and may provide the data 220 to the message relay service 208. The message relay service 208 may use the permissions provided by the electronic message service and the data 220 provided by the obfuscation service 204 to determine whether the author 202 is authorized to transmit an electronic message including this data 220 to one or more customers.

If the message relay service 208 determines that the author 202 is not authorized to transmit the electronic message to customers of the obfuscation service 204, the message relay service 208 may reject the electronic message and transmit a notification to the author 202 and/or the obfuscation service 204 to indicate that the electronic message could not be delivered. However, if the author 202 is authorized to transmit the electronic message to the one or more customers, the message relay service 208 may forward the message via the electronic message service to the recipients' addresses specified in the electronic message. The electronic message service may track delivery of the electronic message to customers of the obfuscation service 204 and transmit information regarding delivery of these electronic messages to the campaign management service 214. The campaign management service 214 may provide information to the author 202 and to the obfuscation service 204 to indicate the progress of the campaign.

Figure 3:
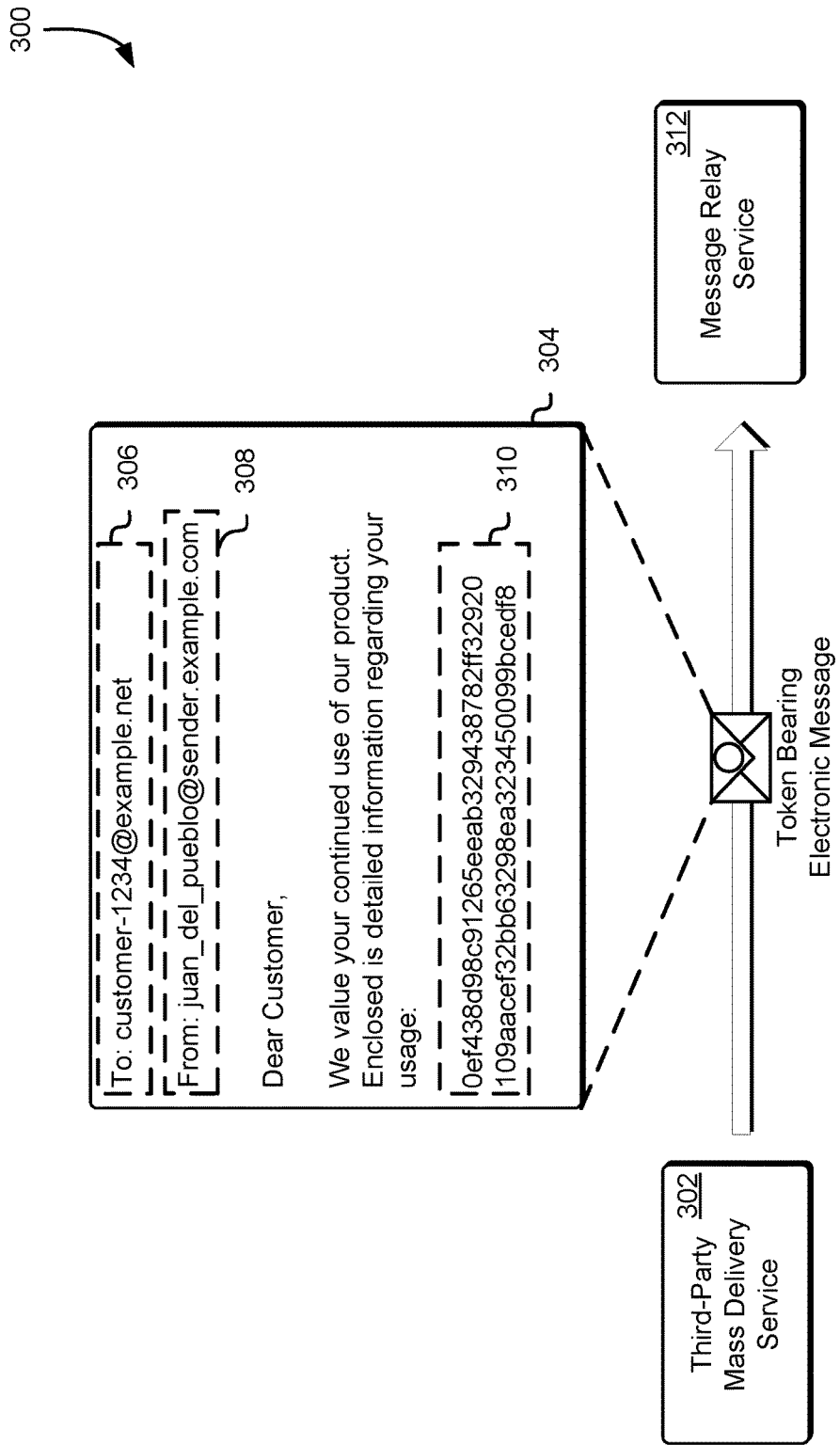
FIG. 3 shows an illustrative example of an environment in which a third-party mass delivery service transmits a token bearing electronic message to a message relay service for de-obscuring any obscured fields within the token bearing electronic message in accordance with at least one embodiment.

As noted above, an author, through a third-party mass delivery service, may generate a token bearing electronic message that includes one or more obscured fields that may be used to prevent dissemination of certain information to the third-party mass delivery service. For instance, the organization may want to prevent inadvertent dissemination of sensitive information to the third-party mass delivery service or to other entities that may not be authorized to access the sensitive information. Accordingly, FIG. 3 shows an illustrative example of an environment 300 in which a third-party mass delivery service 302 transmits a token bearing electronic message 304 to a message relay service 312 for de-obscuring any obscured fields within the token bearing electronic message in accordance with at least one embodiment.

In the environment 300, an author, via an interface provided by the third-party mass delivery service 302, may generate various electronic messages on behalf of an organization for delivery to a variety of customers of the organization. These electronic messages may include material that may be pertinent to the organization's customers, such as information regarding promotional deals, warranty information for products purchased by the customers, coupons, rebates, and the like. In some instances, the organization may provide, in each electronic message, personal information for each customer. For example, the organization may want to include personal usage information for a product purchased by a customer, medical information subject to one or more regulations, personally identifiable information (e.g., Social Security numbers, driver's license numbers, etc.), and the like. The organization may not want to disseminate or otherwise expose this personal information to the third-party mass delivery service 302.

In an embodiment, the author's organization identifies one or more fields of an electronic message that includes sensitive information and obscures these one or more fields to generate a body token 310 within the electronic message. To identify the one or more fields that are to be token bearing, the author may receive input from the organization, which may specify what information in the electronic message is to be obscured. For instance, the author may obtain the body token 310 from the organization in response to a request to obtain data that is to be included in the electronic message. Alternatively, the organization may provide the body token 310 to the third-party mass delivery service 302, which the third-party mass delivery service 302 may present to the author via an interface, such as a GUI, as the author generates the electronic message. The organization may further specify a method for obscuring the selected fields of the electronic message to generate the body token 310. For example, the organization may replace plaintext data in the selected fields of the electronic message with encrypted data. This encrypted data may include metadata that may be used to determine a method for decryption of the encrypted data. The metadata may specify a name of a cryptographic key used for encryption of the plaintext data, an algorithm utilized to encrypt the plaintext data, and the like. The metadata may also include one or more characters or other parameters that may be used by the author to identify, generally, the subject of the contents of the body token 310 without being able to identify the contents of the body token 310.

The author may alternatively include, as a body token 310 in the electronic message, a workflow data element, which may include a lookup number usable to identify one or more instructions or an XML object comprising these one or more instructions. The instructions in the workflow data element may cause the message relay service 312 to identify other tokens present in the token bearing electronic message 304 that is transmitted via the third-party mass delivery service 302. Additionally, the instructions in the workflow data element may cause the message relay service 312 to route these tokens to other services that may de-obscure these tokens. These other services may provide, in place of a token, information that is to be provided to the customer but may not be disseminated to other entities, such as the third-party mass delivery service 302. Additionally, these other services may have the cryptographic keys available to decrypt the encrypted data specified in a particular body token 310 of the token bearing electronic message 304. The instructions included in the workflow data element or retrieved using the lookup number specified in the workflow data element may include specific rules for de-obscuring a body token 310 in the token bearing electronic message 304. For example, a specific rule may specify that if the recipient is not a particular entity specified in the rule, the entity is to provide the token bearing electronic message 304 to a specific electronic address specified in the token bearing electronic message 304 for de-obscuring of one or more body tokens 310. Alternatively, if the entity receiving the token bearing electronic message 304 is specified in the rule, the entity may perform various operations to de-obscure the one or more body tokens 310. Thus, the workflow data element may be used to provide complex rules for de-obscuring body tokens 310 and for routing the body tokens 310 or the token bearing electronic message 304 to other services for de-obscuring of the body tokens 310.

In an embodiment, the author substitutes an electronic message address token 306 for the true electronic message address of the intended recipient (e.g., customer) of the electronic message. The electronic message address token 306 may be formatted using a general format of an electronic message address, including the name of a mailbox and a domain name. The electronic message address token 306 may be subject to a protocol such as SMTP, as defined in Request For Comments (RFC) 5321, RFC 5322, and RFC 6531. The electronic message address token 306 may be generated by an obfuscation service from which the author is the electronic message to a customer. While electronic message addresses are used extensively throughout the present disclosure for the purpose of illustration, the electronic message address token 306 can be formatted using any contact address that may be used to deliver the token bearing electronic message 304 to a particular recipient. For instance, the electronic message address token 306 may specify an Internet Protocol (IP) address, a Uniform Resource Identifier (URI), a user handle or name within a particular service, and the like. The electronic message address token 306 may specify an address for the obfuscation service's servers or for an electronic message service associated with the obfuscation service for processing of token bearing electronic messages 304 on its behalf.

The third-party mass delivery service 302 may transmit the token bearing electronic message 304 to a message relay service 312 for delivery. In response to receiving the token bearing electronic message 304 from the third-party mass delivery service 302, the message relay service 312 may identify, from the token bearing electronic message 304, the electronic address 308 of the author that generated the token bearing electronic message 304. The electronic address 308 of the author may also be subject to the protocols described above in connection with the electronic message address token 306. For instance, the electronic address 308 of the author may specify a domain name corresponding to the obfuscation service and to an electronic message service associated with the obfuscation service. The message relay service 312 may transmit the one or more tokens 306, 310 from the token bearing electronic message 304, as well as the electronic address 308 of the author, to the electronic message service to determine whether the author is authorized to send the electronic message on behalf of the obfuscation service. Based at least in part on the permissions identified by the electronic message service for the author, the message relay service 312 may determine whether the electronic message may be delivered to the intended recipients or rejected.

Figure 4:
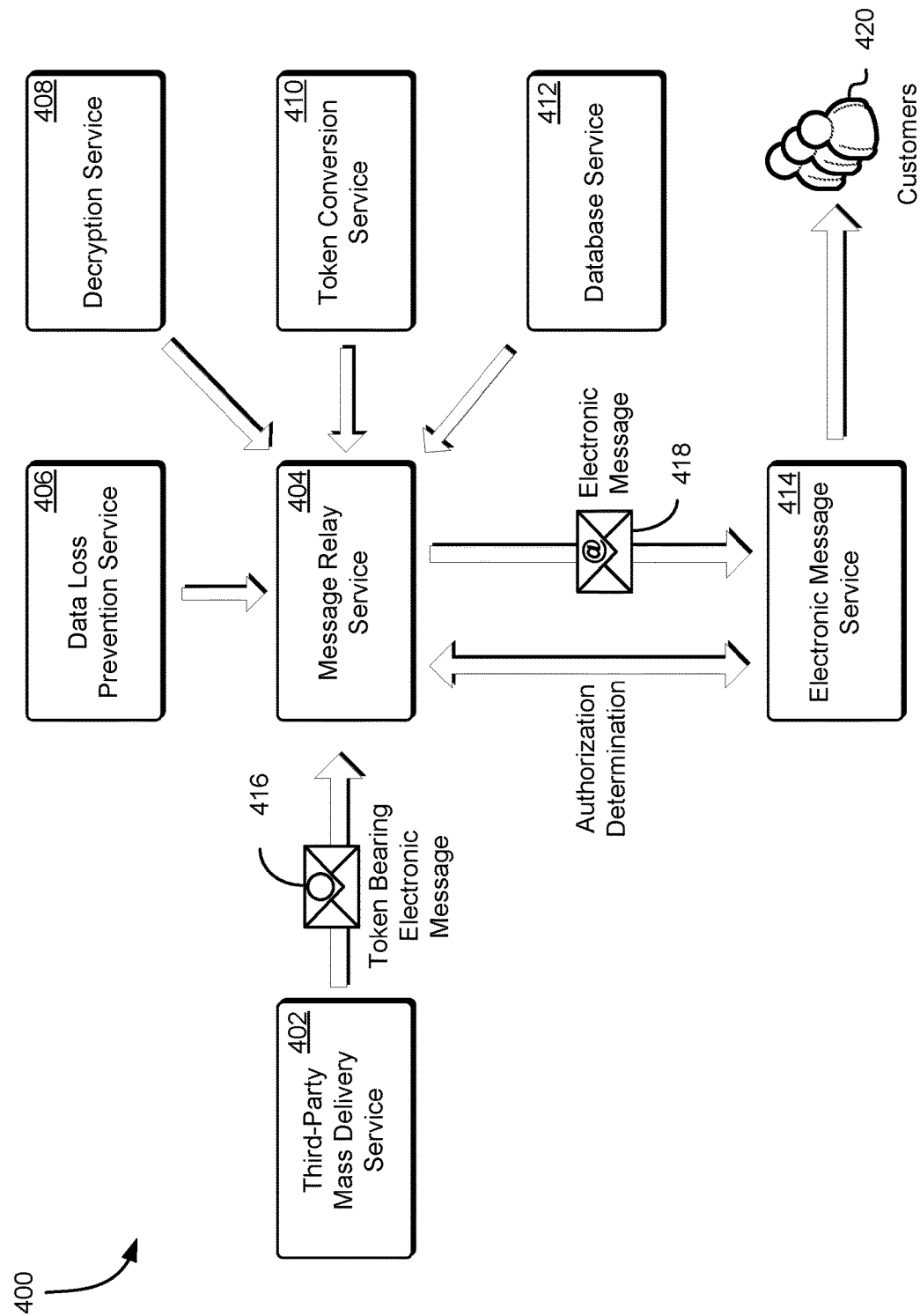
FIG. 4 shows an illustrative example of an environment in which a message relay service determines authorization of an author to enable an electronic message to be transmitted by a third-party mass delivery service to customers of an obfuscation service in accordance with at least one embodiment.

As noted above, the third-party mass delivery service may transmit a token bearing electronic message to a message relay service for delivery to one or more customers of a obfuscation service. For instance, the token bearing electronic message may include an electronic message address token that may specify a contact address for the message relay service for the processing of token bearing electronic messages. This message relay service may determine whether the author identified in the token bearing electronic message is authorized to transmit the electronic message to customers of the obfuscation service on behalf of the obfuscation service. Further, the message relay service may de-obscure any obscured fields in the token bearing electronic messages and prepare the electronic messages for delivery to customers of the obfuscation service. Accordingly, FIG. 4 shows an illustrative example of an environment 400 in which a message relay service 404 determines authorization of an author to enable an electronic message 418 to be transmitted by a third-party mass delivery service 402 to customers of a obfuscation service in accordance with at least one embodiment.

In the environment 400, a third-party mass delivery service 402 may evaluate a token bearing electronic message 416 generated by an author on behalf of a obfuscation service delivering electronic messages to its customers 420 to determine whether the token bearing electronic message 416 includes a contact address for a recipient of the token bearing electronic message 416. For example, the token bearing electronic message 416 may include an electronic message address token that may specify an electronic message address, an IP address, a URI, a user handle or name within a particular service, and the like. The electronic message address token may specify an address for a message relay service 404 associated with the obfuscation service for processing of token bearing electronic messages on its behalf. Thus, the third-party mass delivery service 402 may utilize the electronic message address token to transmit the token bearing electronic message 416 to the message relay service 404 for processing.

In response to receiving a token bearing electronic message 416 from the third-party mass delivery service 402, the message relay service 404 may parse the token bearing electronic message 416 to identify any token bearing or otherwise obscured fields in the token bearing electronic message 416. The message relay service 404 may be provided by a service provider utilized by the obfuscation service for de-obscuring token bearing electronic messages 416 transmitted by one or more authors or other users on behalf of the obfuscation service. Through the message relay service 404, the obfuscation service may provide data that may be inserted in place of an obscured or token bearing field of the token bearing electronic message 416. For instance, the obfuscation service may update a database of the message relay service 404 to associate metadata of a token bearing field of the token bearing electronic message 416 with plaintext data that may be inserted in place of the token bearing field in the token bearing electronic message 416. Alternatively, the obfuscation service may provide a cryptographic key or other information that may be used to derive a cryptographic key for the decryption of encrypted fields in the token bearing electronic message 416. The obfuscation service may also specify one or more services that may be used by the message relay service 404 to de-obscure any token bearing fields in the token bearing electronic message 416, as described in greater detail below.

In an embodiment, the message relay service 404 identifies, from the token bearing electronic message 416, an electronic address of the author, which can be used to identify one or more permissions usable to determine whether the author is authorized to transmit the electronic message on behalf of the author organization. The message relay service 404 may transmit, to the electronic message service 414, the electronic address of the author, as well as other characteristics of the token bearing electronic message 416 (e.g., obscured fields, size of the token bearing electronic message 416, electronic addresses of intended recipients of the electronic message, etc.). The electronic message service 414 may use the author's electronic address to identify one or more permissions associated with the author and defined by the obfuscation service. These permissions may impose limitations on the operations that the author may perform. For example, the permissions may specified that the author can transmit electronic messages only to certain customers 420, can transmit electronic messages that are under a data size limit, can transmit electronic messages that do not include the obfuscation service's logos or that are limited to particular subjects, and the like. The permissions may further specify a rate at which the author may transmit electronic messages to the customers 420.

Based at least in part on the permissions identified and the information provided by the message relay service 404, the electronic message service 414 may generate an authorization determination that may be transmitted to the message relay service 404. For instance, if the electronic message service 414 determines that the author is not authorized to transmit the electronic message to the customers 420, the message relay service 404 may reject the token bearing electronic message 416 and transmit a notification to the author and/or the obfuscation service to indicate that the electronic message could not be delivered to the customers 420. Alternatively, if the electronic message service 414 determines that further analysis of the de-obscured data is needed to determine whether the author is authorized to transmit the electronic message to customers 420, the electronic message service 414 may transmit the identified permissions to the message relay service 404. Similarly, the electronic message service 414 may evaluate the electronic message 418 in response to receiving the electronic message 418 from the message relay service 404 once the obscured fields have been de-obscured.

As noted above, the message relay service 404 may parse through the data included in the token bearing electronic message 416 obtained from the third-party mass delivery service 402 to identify the token bearing or encrypted fields. For each token bearing or encrypted field identified in the token bearing electronic message 416, the message relay service 404 may determine whether it is able to de-obscure these fields. For example, if an encrypted field includes metadata specifying an identifier of a cryptographic key utilized to encrypt data in the field, the message relay service 404 may determine whether it has a cryptographic key or access to an algorithm usable to decrypt the encrypted field. Alternatively, if the token bearing electronic message 416 includes a workflow data element that includes a lookup number, the message relay service 404 may utilize the lookup number to identify, from a database, one or more instructions provided by the organization or the obfuscation service for processing the token bearing fields in the token bearing electronic message 416. These instructions, if executed by the message relay service 404, may cause the message relay service 404 to de-obscure the token bearing fields in the token bearing electronic message 416. In some embodiments, the message relay service 404 undertakes de-obscuring of any obscured fields in the token bearing electronic message 416 if the electronic message service 414 determines that the author is authorized to transmit the electronic message to customers 420 or if further evaluation of the electronic message with the de-obscured fields is required by the electronic message service 414. If the electronic message service 414 has indicated that the author is not authorized to transmit the electronic message on behalf of the obfuscation service, the message relay service 404 may reject the token bearing electronic message 416 without de-obscuring any obscured fields of the token bearing electronic message 416.

In some embodiments, the message relay service 404 transmits one or more token bearing fields from the token bearing electronic message 416 to one or more services that may de-obscure these fields. For instance, the token bearing electronic message 416 may include a workflow data element comprising one or more instructions that may cause the message relay service 404 to detect certain token bearing fields in the token bearing electronic message 416 that are to be delivered to another service. Alternatively, the metadata for a token bearing field may specify an address or an identifier for another service that is capable of de-obscuring the token bearing field. In some instances, the message relay service 404 may evaluate a token bearing field and determine that it cannot de-obscure the field. The message relay service 404 may query a service provider to identify a service provided by the service provider that is capable of de-obscuring the token bearing field.

If the message relay service 404 is able to de-obscure one or more token bearing fields of the token bearing electronic message 416, the message relay service 404 may transmit a request to a data loss prevention service 406 to obtain one or more data loss prevention rules that may be used to determine if the token bearing electronic message 416 includes any disallowed elements. The data loss prevention service 406 may comprise one or more databases that specify, for each organization, one or more data loss prevention rules for prohibited content for electronic messages. For instance, the data loss prevention service 406 may provide a rule to the message relay service 404 indicating that no electronic message from a particular organization can include encrypted data when delivered to its customers 420. Thus, the message relay service 404 may evaluate a token bearing electronic message 316 to determine whether the token bearing electronic message 416 includes encrypted data. If the token bearing electronic message 416 includes encrypted data, the message relay service 404 may attempt to decrypt the field or identify a service that can decrypt the field on its behalf. Alternatively, a rule may specify that certain data is to be redacted. If the token bearing electronic message 416 includes such data, the message relay service 404 may redact this data from the message.

In some embodiments, the data loss prevention service 406 also evaluates the de-obscured fields in the token bearing electronic message 416 to determine whether the de-obscured fields satisfy one or more quality control constraints imposed by the obfuscation service or other entity that maintains the message relay service 404. For instance, the data loss prevention service 406 may evaluate the de-obscured fields to determine whether any of these fields include profanity, disparaging content, libelous content, malware or spyware, and any other offensive material that is not suitable for dissemination to customers 420. If the data loss prevention service 406 determines that any of the de-obscured fields in the token bearing electronic message 416 do not satisfy the quality control constraints, the data loss prevention service 406 may perform one or more operations to address the issue. This may include modifying the de-obscured field to remove the offending material, contacting the obfuscation service or organization that generated the content to provide a replacement for the offending material, or causing the message relay service 404 to prevent delivery of the electronic message 418 to the specified recipient. In some instances, the data loss prevention service 406 may prevent the obfuscation service, and/or the third-party mass delivery service 402 from being able to provide token bearing electronic messages to the message relay service 404 until any identified issues are resolved by the obfuscation service and/or the third-party mass delivery service 402.

The message relay service 404 may also utilize a decryption service 408 provided by a service provider utilized by the obfuscation service for decryption of one or more encrypted fields in the token bearing electronic message 416. The decryption service 408 may comprise computer systems that may utilize cryptographic keys or cryptographic algorithms for decrypting data provided to the decryption service 408 from myriad sources. Additionally, the decryption service 408 may serve as a repository for an obfuscation service's cryptographic keys. For instance, the obfuscation service may interact with a decryption service 408 to define a cryptographic key pair that may be used for encryption of data that is to be included in a token bearing electronic message 416. Alternatively, the obfuscation service may provide a cryptographic key to the decryption service 408 for decryption of encrypted fields in a token bearing electronic message 416. As described above, an encrypted field of the token bearing electronic message 416 may include metadata that specifies an identifier for a cryptographic key that was used to encrypt the field. The metadata may also specify an address for the decryption service 408. The message relay service 404 may transmit the token bearing electronic message 416 or the data in the encrypted field to the decryption service 408 for decryption of the encrypted data specified in the encrypted field. The decryption service 408 may provide the decrypted field or the token bearing electronic message 416 with the decrypted field to the message relay service 404 for additional processing. Alternatively, the decryption service 408 may query the message relay service 404 to identify the customer's contact address and may transmit the electronic message to the customer through an SMTP gateway, such as the electronic message service 414.

In some instances, the message relay service 404 may utilize a token conversion service 410 provided by a service provider utilized by the obfuscation service for the de-obscuring of tokens included in the token bearing electronic message 416. The token conversion service 410 may comprise computer systems that may include one or more databases specifying data that can be provided in place of tokens specified in a token bearing electronic message 416. The token conversion service 410 may thus serve as a key-value store for sensitive information, whereby token identifiers may correspond to particular sensitive information or other information that may be provided in an electronic message to customers 420 of the obfuscation service. Additionally, the token conversion service 410 may include databases with key-value pairs for lookup numbers and instructions for the processing of tokens in the token bearing electronic message 416. If the message relay service 404 transmits a token from the token bearing electronic message 416 to the token conversion service 410, the token conversion service 410 may evaluate the token to identify an identifier for the token. This may include the aforementioned lookup number or other identifier that may be used to identify a key-value pair within its databases. The token conversion service 410 may query these databases to identify the sensitive information or instructions for processing the received token. If the token conversion service 410 identifies sensitive information associated with the provided token, the token conversion service 410 may transmit the sensitive information to the message relay service 404 for inclusion in the electronic message. In some instances, if the token conversion service 410 determines that the sensitive information cannot be provided to the message relay service 404 (e.g., the obfuscation service does not want to expose the information to the message relay service 404, etc.), the token conversion service 410 may transmit a request to the message relay service 404 to provide the token bearing electronic message 416 once the other fields of the token bearing electronic message 416 have been de-obscured. The token conversion service 410 may replace the token with the sensitive information and evaluate the electronic message 418 against the author's permissions from the electronic message service 414. If the author is authorized to transmit an electronic message comprising the sensitive information, the token conversion service 410 may transmit the electronic message 418 to the customer through its own electronic message service or other private gateway.

The message relay service 404 may utilize a database service 412 of the service provider or of the obfuscation service to translate any electronic message address tokens specified in the token bearing electronic message 416 into the actual contact address for the customer 420 that is to receive the electronic message 418. The database service 412 may include one or more computer systems and datastores that maintain one or more databases that comprise key-value pairs corresponding to electronic message address tokens and contact addresses for customers 420 and other targeted recipients of electronic messages. In response to receiving an electronic message address token from the message relay service 404, the database service 412 may query the one or more databases to determine whether there is a key-value pair corresponding to the provided electronic message address token. If a key-value pair is identified, the database service 412 may identify the corresponding contact address for the intended customer or other recipient and provide this contact address to the message relay service 404. The message relay service 404 may substitute the electronic message address token in the token bearing electronic message 416 for the received contact address to de-obscure the token bearing electronic message 416, resulting in the de-obscured electronic message 418. In some embodiments, the message relay service 404 provides the token bearing electronic message 416 to the database service 412 once the obscured tokens included in the body of the token bearing electronic message 416 have been de-obscured. The database service 412 may de-obscure the electronic message address token to obtain the actual contact address for the customer or other recipient. The database service 412 may utilize the permissions from the electronic message service 414 to determine whether the author is authorized to transmit the electronic message to the intended recipient. If the author is authorized to do so, the database service 412 may utilize the electronic message service 414 or other private gateway (e.g., the database service 412 is associated with a different service provider, such as another authorized service provider) to deliver the electronic message 418 to the intended recipient.

It should be noted that while the message relay service 404 may rely on the aforementioned services for de-obscuring the various obscured tokens presented in the token bearing electronic message 416, the message relay service 404 may be capable of de-obscuring any tokens in the token bearing electronic message 416 using additional, fewer, or alternative services. For instance, the message relay service 404 may have the functionality of the aforementioned services to de-obscure the tokens itself. Alternatively, the tokens specified in the token bearing electronic message 416 may not be of the type which would cause the message relay service 404 to transmit the token to a particular service for de-obscuring. If the message relay service 404 determines that the token bearing electronic message has been de-obscured, resulting in the electronic message 418, the message relay service 404 may transmit the electronic message 418 to the electronic message service 414 for delivery to the customer 420 or other recipient whose contact address is specified therein. In some embodiments, the message relay service 404 transmits the electronic message 418 to the customer 420 without utilizing the electronic message service 414. For instance, the message relay service 404 may utilize its own SMTP server or gateway for delivery of the electronic message 418 to the customer 420.

Figure 5:
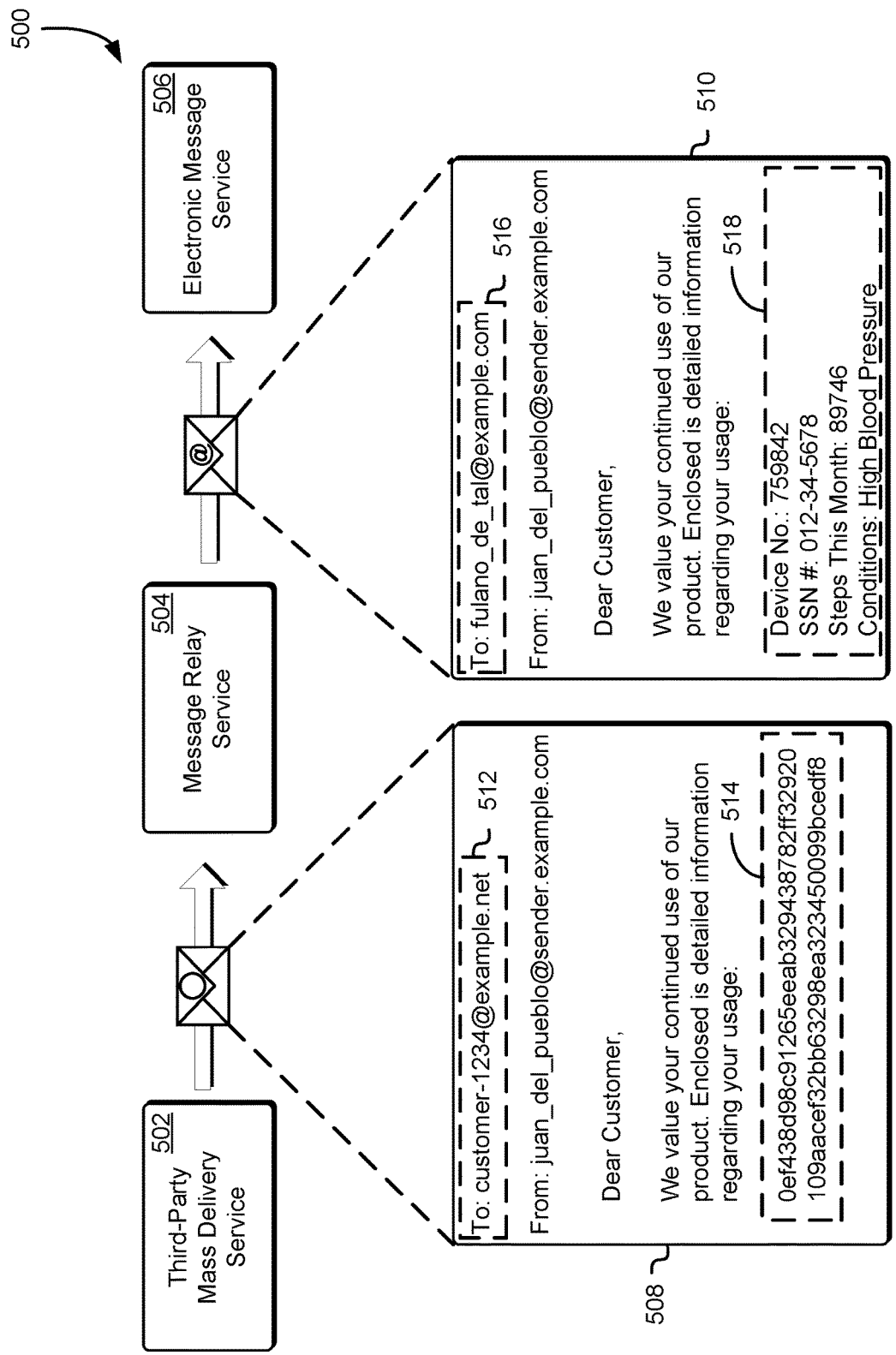
FIG. 5 shows an illustrative example of an environment in which a message relay service de-obscures one or more obscured fields in a token bearing electronic message in accordance with at least one embodiment.

As noted above, a message relay service may receive a token bearing electronic message from a third-party mass delivery service for de-obscuring of one or more tokens presented in the token bearing electronic message. The message relay service may utilize one or more processes or other services for de-obscuring these tokens, resulting in plaintext data in the electronic message that can be provided to an intended recipient of the electronic message. Further, the message relay service may determine whether the author that generated the token bearing electronic message is authorized to transmit the electronic message on behalf of an obfuscation service. If the message relay service determines that the author is authorized to transmit the electronic message on behalf of the obfuscation service to the intended recipients, the message relay service may transmit the de-obscured electronic message to the electronic message service for delivery to the electronic addresses of customers specified in the electronic message. Accordingly, FIG. 5 shows an illustrative example of an environment 500 in which a message relay service 504 de-obscures one or more obscured fields 512, 514 in a token bearing electronic message 508 in accordance with at least one embodiment. The environment 500 may be similar to the environment 400 illustrated in FIG. 4 and described above. For instance, the third-party mass delivery service 502 may transmit a token bearing electronic message 508 to the message relay service 504 based at least in part on an electronic message address token specified in the token bearing electronic message 508.

The message relay service 504 may transmit a request to the electronic message service 506 to determine whether the author, as identified via an author electronic address specified in the token bearing electronic message 508, is authorized to transmit the electronic message on behalf of an obfuscation service to one or more of its customers or other entities. For instance, the message relay service 504 may transmit, to the electronic message service 506, the electronic address of the author, as well as other characteristics of the token bearing electronic message 508 that can be used to determine whether the author is authorized to transmit the electronic message on behalf of the obfuscation service. The electronic message service 506 may use the author's electronic address to identify one or more permissions associated with the author and defined by the obfuscation service. These permissions may impose limitations on the operations that the author may perform. The permissions may further specify a rate at which the author may transmit electronic messages to the customers.

If the author is authorized to transmit the electronic message to customers of the obfuscation service or the electronic message service 506 provides permissions usable by the message relay service 504 to make such a determination based at least in part on de-obscured fields of the electronic message, the message relay service 504 may de-obscure any obscured fields in the token bearing electronic message 508. The token bearing electronic message 508 may include an electronic message address token 512 and one or more body tokens 514 as defined by the obfuscation service or the author that generated the token bearing electronic message 508. The electronic message address token 512 may be formatted using a general format of an electronic message address, including the name of a mailbox and a domain name. The electronic message address token 512 may be subject to a protocol such as SMTP. The electronic message address token 512 may specify an address for the message relay service 504 for processing of token bearing electronic messages 508. Thus, the third-party mass delivery service 502 may use the electronic message address token 512 to transmit the token bearing electronic message 508 to the message relay service 504.

The one or more body tokens 514 included in the token bearing electronic message 508 may include an anonymous identifier for a customer's contact address that may be specific to a particular partner, such as the third-party mass delivery service 502 or other service. The one or more body tokens 514 may also include encrypted data in a form that includes metadata that may be used to identify a method of decryption. The metadata may specify an identifier of a cryptographic key or algorithm utilized for encryption, as well as an address or identifier of a service that is to perform decryption of the body token 514. Additionally or alternatively, the one or more body tokens 514 may include a workflow data element that includes a lookup number usable to identify one or more instructions for obtaining data to be included in the electronic message or an object generated using a programmatic language (e.g., XML, etc.) that may include the one or more executable instructions. These instructions may be used by the message relay service 504 to identify other body tokens 514 in the token bearing electronic message 508 and where to route these body tokens 514 for resolution. In some embodiments, if the token bearing electronic message 508 does not include a workflow data element, the message relay service 504 will utilize its own processes or other standard services associated with the message relay service 504 to de-obscure the body tokens 514.

In response to receiving the token bearing electronic message 508 from the third-party mass delivery service 502, the message relay service 504 may parse through the token bearing electronic message 508 to identify any workflow data elements. If the message relay service 504 identifies one or more workflow data elements, the message relay service 504 may utilize these workflow data elements to identify any body tokens 514 included in the token bearing electronic message 508. Alternatively, if the token bearing electronic message 508 does not include at least one workflow data element, the message relay service 504 may identify the body tokens 514 itself without additional input or instruction. If the author is authorized to transmit the electronic message on behalf of the obfuscation service to its customers, the message relay service 504 may de-obscure the body tokens 514. For instance, for each body token 514 identified, the message relay service 504 may determine whether it is able to de-obscure the body token 514. If it cannot do so, the message relay service 504 may identify another service that may de-obscure the body token 514 and transmit the body token 514 to the identified service. In some instances, the message relay service 504 may de-obscure any body tokens 514 it has identified prior to sending the token bearing electronic message 508 to another service for de-obscuring any remaining body tokens. The other service may de-obscure any remaining body tokens and transmit the electronic message address token 512 to the message relay service 504 for de-obscuring. The message relay service 504 may provide the actual contact address for the intended recipient, which may enable the other service to transmit the electronic message 510 through its own gateway or server to the customer.

If the message relay service 504 is able to de-obscure the body tokens 514 in the token bearing electronic message 508 or receives the de-obscured data 518 from the one or more services utilized to de-obscure the body tokens 514, the message relay service 504 may de-obscure the electronic message address token 512 to obtain the actual recipient contact address 516 for the customer that is to receive the electronic message 510. The message relay service 504 may evaluate any outstanding permissions from the electronic message service 506 to determine whether the author is authorized to transmit a message comprising the de-obscured data 518 to the customer on behalf of the obfuscation service. If so, the message relay service 504 may forward the electronic message 510 via the electronic message service 506 or other SMTP mail server to the contact address 516 specified in the electronic message 510. Alternatively, if the contact address 516 does not follow the SMTP format, the message relay service 504 may forward the electronic message 510 to a non-SMTP gateway or service, based at least in part on the format of the contact address 516. In this manner, the previously token bearing electronic message 508 may arrive to the customer in a de-obscured format.

Figure 6:
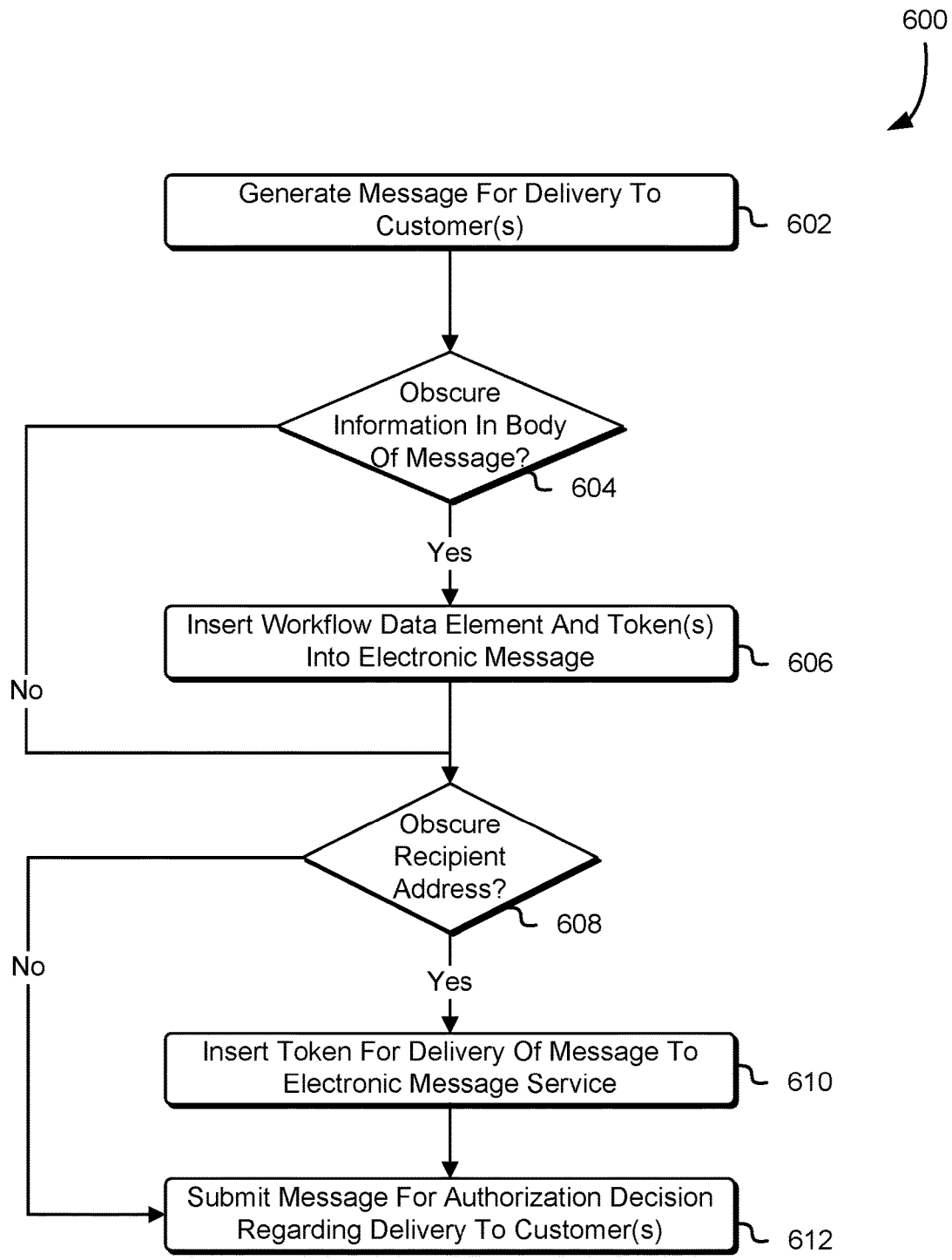
FIG. 6 shows an illustrative example of a process for obscuring one or more fields of an electronic message to be submitted for delivery to one or more customers in accordance with at least one embodiment.

As noted above, an author, operating on behalf of an obfuscation service, may access a third-party mass delivery service to generate an electronic message for delivery to customers of the obfuscation service or other recipients on behalf of the obfuscation service. The obfuscation service may not want to expose sensitive information that is to be included in the electronic message to the third-party mass delivery service, which may be delivering the electronic message to the customers and other recipients. As a result, the obfuscation service may transmit, to the third-party mass delivery service one or more tokens that may be inserted into the electronic message by the author via the third-party mass delivery service. These one or more tokens may obscure one or more fields of the electronic message to prevent dissemination of sensitive information to the third-party mass delivery service. Accordingly, FIG. 6 shows an illustrative example of a process 600 for obscuring one or more fields of an electronic message to be submitted for delivery to one or more customers in accordance with at least one embodiment. The process 600 may be performed by an author or other computer system utilized by a user on behalf of an obfuscation service for delivery of electronic message to customers on behalf of the obfuscation service.

At any time, an author may access a third-party mass delivery service to select a template for generating a campaign for delivering electronic messages to customers of the obfuscation service and other recipients for which the author will be transmitting electronic messages on behalf of the obfuscation service. Thus, through an interface provided by the third-party mass delivery service, an author may generate 602 an electronic message for delivery to one or more customers of the obfuscation service.

In some embodiments, the obfuscation service provides the author with one or more tokens that may include obscured data that is to be included in the electronic message. Alternatively, the author may access a token bearing data repository of the third-party mass delivery service to identify one or more tokens that may be inserted into the electronic message. For instance, the metadata of a token may specify information usable by the author to identify, generally, the characteristics of the token without being able to discern the actual contents of the token. For example, the metadata may specify that the token includes telemetry data for a customer's device. However, the author may be unable to de-obscure the token to access the telemetry data. In some instances, the obfuscation service may permit the author to provide plaintext information in the electronic message. Thus, the author may determine 604 whether to include obscured information in the body of the electronic message. If the author determines, based at least in part on information provided by the obfuscation service, that information within the electronic message is to be obscured, the author may insert 606 one or more body tokens and workflow data elements that may be used by a message relay service associated with the obfuscation service for de-obscuring these one or more body tokens.

If the author determines that no portions of the electronic message are to be obscured or the author inserts one or more body tokens in the body of the electronic message, the author may determine 608 whether to obscure a recipient address by inserting an electronic address token into the electronic message. For instance, the obfuscation service may provide, to the author or to the third-party mass delivery service, electronic address tokens that may be used to replace the actual electronic addresses for the intended recipients. These tokens may be formatted to mimic the format of the electronic addresses for the intended recipients. For instance, the token may utilize a SMTP format to enable delivery of the electronic message to an SMTP server specified in the domain of the token. Alternatively, the obfuscation service may specify an address for a message relay service that may process the electronic message. The obfuscation service may obscure the recipient electronic address with a token that specifies the address of the message relay service. Thus, if the obfuscation service determines that the recipient address is to be obscured using a token, the author may insert 610 a token to enable delivery of the electronic message to an electronic mail message specified in the token.

The author may submit 612 the electronic message, through an interface of the third-party mass delivery service, for determining an authorization decision regarding delivery of the electronic message to one or more recipients. If the electronic message does not include any obscured elements, the third-party mass delivery service may transmit the message to the electronic message service, which may determine whether the author is authorized to transmit the electronic message on behalf of the obfuscation service to the one or more intended recipients specified in the electronic message. This particular electronic message may not have any obscured information, which may cause the third-party mass delivery service to evaluate any data within the electronic message. If information within the electronic message is obscured, the third-party mass delivery service may be unable to evaluate the data that has been obscured by the obfuscation service. If the obfuscation service replaces the recipient's electronic address with a token indicating an electronic address for a message relay service, the third-party mass delivery service may transmit the electronic message to the message relay service.

Figure 7:
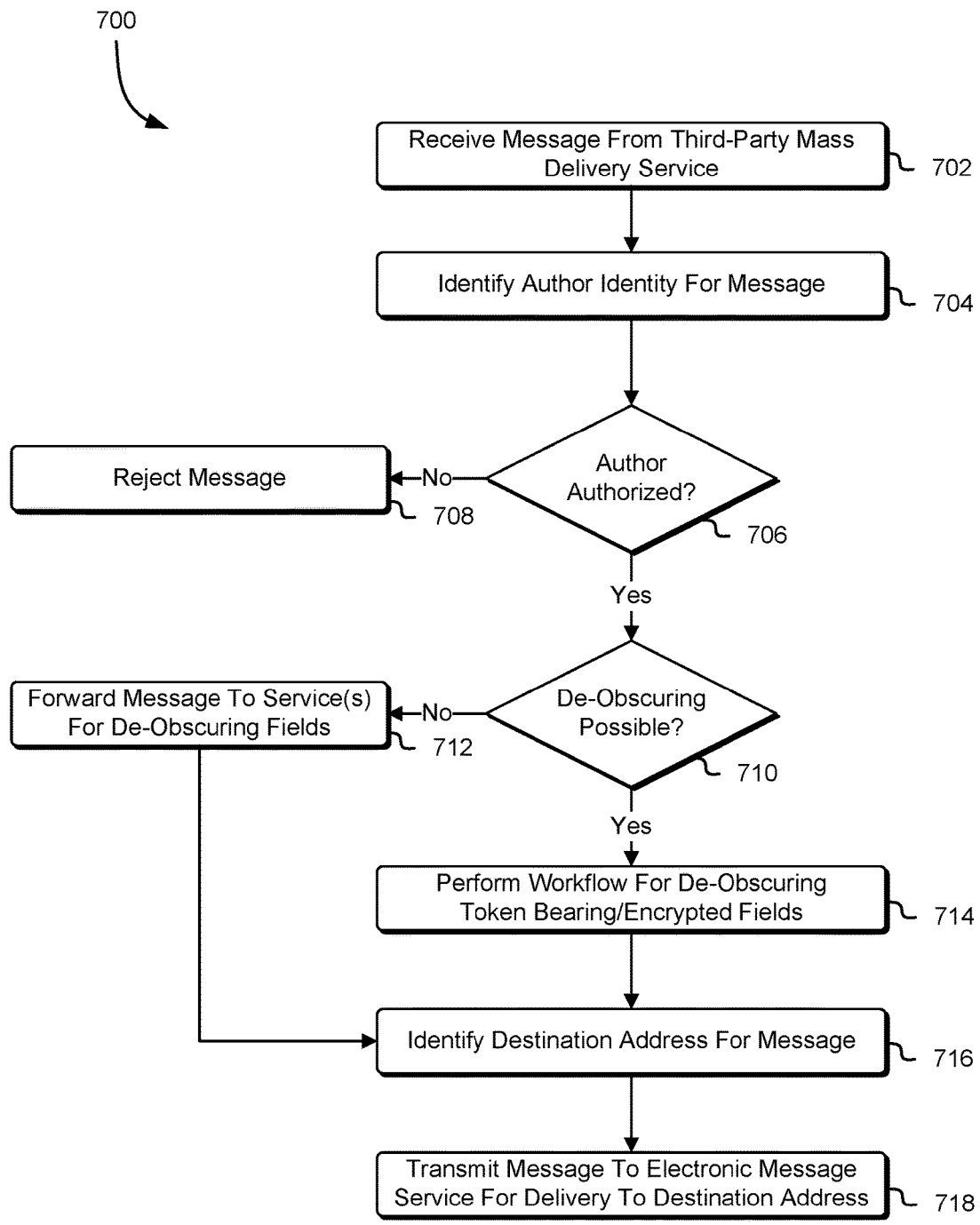
FIG. 7 shows an illustrative example of a process for de-obscuring one or more obscured fields in an electronic message transmitted by a third-party mass delivery service on behalf of an author in accordance with at least one embodiment.

As noted above, a message relay service, in response to receiving a token bearing electronic message from a third-party mass delivery service, may evaluate the token bearing electronic message to identify the author of the electronic message (e.g., the entity that generated the electronic message via the third-party mass delivery service). The message relay service may transmit a request to an electronic message service to determine whether the author is authorized to transmit the electronic message to the intended recipients on behalf of the obfuscation service. If the author is authorized to do so, the message relay service may de-obscure any obscured fields in the token bearing electronic message and transmit the electronic message to the electronic message service for delivery to the destination address. Accordingly, FIG. 7 shows an illustrative example of a process 700 for de-obscuring one or more obscured fields in an electronic message transmitted by a third-party mass delivery service on behalf of an author in accordance with at least one embodiment. The process 700 may be performed by the message relay service, which may receive electronic messages from the third-party mass delivery service and may de-obscure token bearing fields of an electronic message or provide the token bearing fields to one or more services that may de-obscure these fields. Additionally, the message relay service may provide the de-token bearing electronic message to the electronic message service for delivery to the intended recipient.

A third-party mass delivery service may receive a request from an author to transmit an electronic message on behalf of an obfuscation service to an entity corresponding to an electronic address specified therein. This electronic message may include one or more obscured fields in the body of the electronic message that are to be de-obscured before delivery to another recipient. Based at least in part on the electronic address specified in the electronic message, the third-party mass delivery service may transmit the electronic message to the message relay service entrusted by the obfuscation service with de-obscuring the obscured fields in the body of the electronic message. Thus, the message relay service may receive 702 the electronic message from the third-party mass delivery service.

In response to receiving the electronic message from the third-party mass delivery service, the message relay service may parse the electronic message to identify 704 the identity of the author that generated the electronic message. For instance, in a "from" field of the electronic message, the electronic message may specify the electronic address of the author. Alternatively, the electronic message may specify an identifier of the author, such as a user name or other alias that corresponds to the identity of the author within the obfuscation service. For instance, the electronic message may specify an alias of the author that may be mapped to another electronic address corresponding to a domain other than the domain of the obfuscation service. Thus, the message relay service may transmit the alias to the obfuscation service, which may use the alias to identify the true electronic address or identity of the author.

The message relay service may transmit a request to the electronic message service to determine 706 whether the author is authorized to transmit the electronic message on behalf of the obfuscation service to customers of the obfuscation service and to other recipients specified in the electronic message. The request may specify the electronic address or other identifier of the author, as well as any obscured fields identified in the electronic message and characteristics of the electronic message (e.g., size, any hyperlinks specified in the electronic message, any plaintext specified in the electronic message, images, attachments, etc.). As noted above, the electronic message service may query a permissions database to identify an entry corresponding to the electronic address or other identifier specified by the message relay service in its request. If there is no entry corresponding to the author, the electronic message service may determine that the author is not authorized to transmit the electronic message on behalf of the obfuscation service. As a result of this determination, the electronic message service may transmit a notification to the message relay service to indicate that the token bearing electronic message is to be rejected. Alternatively, if the electronic message service identifies an entry corresponding to the identifier of the author, the electronic message service may obtain any permissions associated with the author to determine whether the author is authorized to transmit the electronic message to the intended customers. The electronic message service may transmit a notification to the message relay service to indicate whether the author is authorized to transmit the electronic message on behalf of the obfuscation service to its customers and/or other recipients.

If the author is not authorized to transmit the electronic message on behalf of the obfuscation service, the message relay service may reject 708 the electronic message. Additionally, the message relay service may transmit a notification to the author and/or to the obfuscation service to indicate that the electronic message could not be delivered to the intended recipients. Alternatively, if the message relay service determines that the author is authorized to transmit the electronic message on behalf of the obfuscation service, the message relay service may evaluate the electronic message to determine 710 whether it can de-obscure the one or more obscured fields in the electronic message. For instance, the message relay service may identify a workflow data element in the electronic message that can be used to identify one or more instructions for identifying the obscured fields of the electronic message and the operations to be performed to de-obscure these fields. In some instances, these operations may include forwarding the obscured fields to another service that is capable of de-obscuring the obscured fields. Additionally, or alternatively, the electronic message may include one or more encrypted fields having metadata that indicates an identifier for a cryptographic key or algorithm used to encrypt the data in the fields. The message relay service may determine if it has access to the cryptographic key or algorithm for decrypting these fields. If it does not have access, it may review the metadata to identify a service that may have the cryptographic key or algorithm for decrypting these fields. Thus, if the message relay service determines that it cannot de-obscure any of the obscured fields in the electronic message, the message relay service may forward 712 the electronic message to one or more services that are capable of de-obscuring these token bearing or encrypted fields of the electronic message.

If the message relay service determines that de-obscuring of the one or more token bearing or encrypted fields of the electronic message is possible, the message relay service may perform 714 a workflow for de-obscuring these token bearing or encrypted fields. For example, the message relay service may obtain a cryptographic key or algorithm from its database and identified via the metadata included in the encrypted field to decrypt the encrypted field. This decryption may result in the replacement of the encrypted field with the decrypted data. As another example, if the electronic message includes a workflow data element comprising instructions for de-obscuring the token bearing fields of the electronic message, the message relay service may execute these instructions to de-obscure the token bearing fields, resulting in de-obscured data being presented in the electronic message.

The message relay service may also identify 716 the destination address for the electronic message. For instance, the message relay service may translate any electronic message address tokens specified in the token bearing electronic message into the actual contact address for the customer that is to receive the electronic message. The message relay service may refer to one or more databases that comprise key-value pairs corresponding to electronic message address tokens and contact addresses for customers and other targeted recipients of electronic messages. The message relay service may query the one or more databases to determine whether there is a key-value pair corresponding to the electronic message address token specified in the token bearing electronic message. If a key-value pair is identified, the message relay service may identify the corresponding contact address for the intended customer or other recipient and substitute the electronic message address token in the token bearing electronic message for the contact address to de-obscure the token bearing electronic message, resulting in the de-obscured electronic message. In some embodiments, the message relay service provides the token bearing electronic message to a database service once the obscured tokens included in the body of the token bearing electronic message have been de-obscured. The database service may de-obscure the electronic message address token to obtain the actual contact address for the customer or other recipient and may utilize the electronic message service or other private gateway (e.g., the database service is associated with a different service provider, such as the organization's own service provider or other authorized service provider) to deliver the electronic message to the intended recipient.

If the message relay service has completed de-obscuring the token bearing and encrypted fields of the electronic message and has identified the destination address for the electronic message, the message relay service may transmit 718 the message to the electronic message service for delivery to the destination address. The customers of the organization utilizing the obfuscation service may receive the electronic message from the electronic message service. In an embodiment, the electronic message service tracks delivery of the electronic messages to the customers to determine whether each electronic message is delivered successfully. Confirmation of delivery of the electronic messages may be transmitted by the electronic message service to the third-party mass delivery service, which may track success of the delivery of the electronic messages to the customers. The third-party mass delivery service may provide this information to the author or to the obfuscation service, which may use the information to determine the success of its campaign to deliver these electronic messages.

Figure 8:
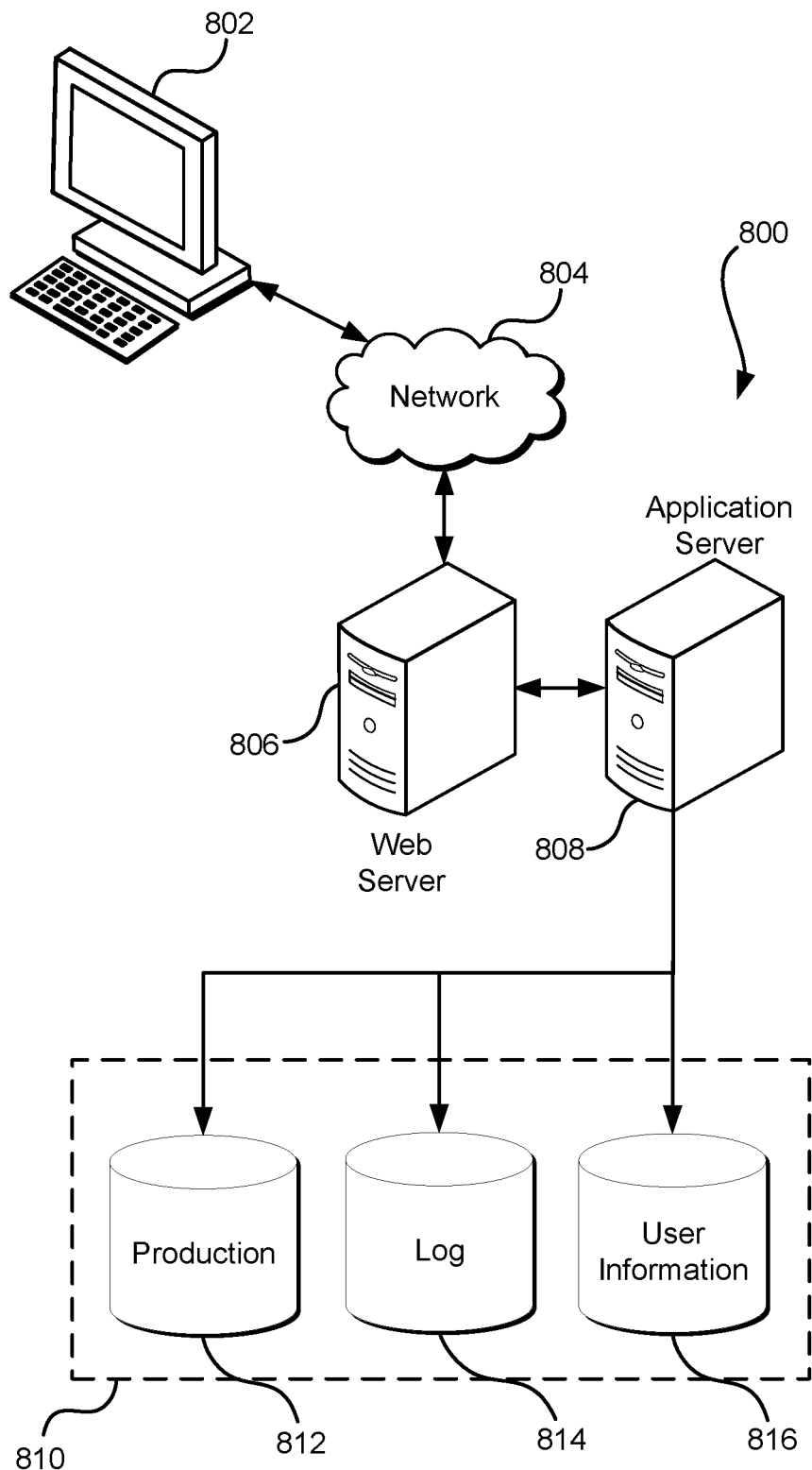
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on (i.e., based at least in part on) the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
  generating an electronic message comprising an electronic address of an authoring entity and obscured data, where plaintext data of the obscured data is unattainable by a third-party mass delivery service and the obscured data includes metadata that specifies one or more parameters for de-obscuring the obscured data;

transmitting, via the third-party mass delivery service, the electronic message to a message relay service for de-obscuring the obscured data;

identifying, based at least in part on the electronic address of the authoring entity and the obscured data, permissions usable to determine whether the authoring entity is authorized to transmit the electronic message;

as a result of the permissions indicating that the authoring entity is authorized to transmit the electronic message to the recipient, evaluating, at the message relay service, the metadata to identify the one or more parameters for de-obscuring the obscured data;

determining, based at least in part on the metadata, that the recipient is authorized to obtain the plaintext data;

utilizing the one or more parameters to de-obscure the obscured data to obtain the plaintext data; and providing the electronic message to the electronic message service for delivery to the recipient.

2. The computer-implemented method of claim 1, further comprising providing, to the third-party mass delivery service, confirmation of delivery of the electronic message to enable the third-party mass delivery service to indicate successful delivery of the electronic message to the authoring entity.

3. The computer-implemented method of claim 1, wherein:

the permissions specify that the authoring entity is authorized to transmit a number of electronic messages within a period of time; and the authoring entity is authorized to transmit the electronic message to the recipient as a result of the authoring entity not having transmitted the number of electronic messages within the period of time.

4. The computer-implemented method of claim 1, wherein the metadata specifies an identifier for a cryptographic key usable to de-obscure the obscured data.

5. A system, comprising at least one computing device configured to implement one or more services, wherein the one or more services:

receive, from a third-party mass delivery service, an electronic message comprising an electronic address of an entity and obscured data, where plaintext data of the obscured data is unattainable by the third-party mass delivery service;

identify, based at least in part on the electronic address of the entity and the obscured data, permissions usable to determine whether the entity is authorized to transmit the electronic message;

as a result of the permissions indicating that the entity is authorized to transmit the electronic message, de-obscure an obscured field in the electronic message to obtain plaintext data; and cause the electronic message including the plaintext data to be transmitted to a recipient specified in the electronic message.

6. The system of claim 5, wherein:

the permissions specify a plurality of recipients to which the entity is authorized to transmit the electronic message; and the entity is authorized to transmit the electronic message as a result of the recipient specified in the electronic message being a member of the plurality of recipients.

7. The system of claim 5, wherein:

the permissions specify a data size limit for electronic messages that can be transmitted by the entity; and the entity is authorized to transmit the electronic message as a result of the electronic message not exceeding the data size limit.

8. The system of claim 5, wherein:

the permissions specify a plurality of subjects for electronic messages that can be transmitted by the entity; and the entity is authorized to transmit the electronic message as a result of the electronic message being directed to a subject that is specified in the plurality of subjects.

9. The system of claim 5, wherein:

the obscured field includes metadata specifying an identifier for a cryptographic key utilized to encrypt the plaintext data to generate the obscured field; and the one or more services further:
obtain the cryptographic key; and
utilize the cryptographic key to decrypt the obscured field to obtain the plaintext data.

10. The system of claim 5, wherein de-obscuring the obscured field includes:

evaluating the obscured field to identify a service that can de-obscure the obscured field, the service being authorized to utilize the plaintext data;

transmitting the obscured field to the service; and obtaining, from the service, the plaintext data.

11. The system of claim 5, wherein:

the permissions specify electronic addresses of entities authorized to transmit the electronic message, electronic addresses of recipients authorized to receive the electronic message, and authorization data specifiable in the obscured data; and the entity is authorized to transmit the electronic message as a result of the electronic address of the entity being specified in the permissions, an electronic address of the recipient being specified in the permissions, or the obscured data specifying the authorization data.

12. The system of claim 5, wherein the one or more services further:

identify, from the electronic message, a workflow data object comprising at least one parameter for de-obscuring the obscured field; and utilize the parameter to de-obscure the obscured field to obtain the plaintext data.

13. A non-transitory computer-readable storage medium having stored thereon executable instructions that, as a result of being executed by one or more processors of a computer system, cause the computer system to at least:

obtain an electronic message comprising obscured data and specifying an electronic address of an entity, where plaintext data of the obscured data is unattainable by a third-party mass delivery service;

identify, based at least in part on the electronic address of the entity, permissions usable to determine whether the entity is authorized to relay the electronic message;

as a result of the permissions indicating that the entity is authorized to relay the electronic message, de-obscure the obscured data to obtain plaintext data; and enable delivery of the electronic message to a recipient specified in the electronic message.

14. The non-transitory computer-readable storage medium of claim 13, wherein the instructions further cause the computer system to:

identify one or more data loss prevention rules prohibiting dissemination of a subset of data;

determine that the electronic message includes the subset of data; and redact the subset of data from the electronic message.

15. The non-transitory computer-readable storage medium of claim 13, wherein the instructions further cause the computer system to:
- determine that the electronic message has been delivered to the recipient; and
- transmit a notification to the third-party mass delivery service to indicate a delivery state of the electronic message to cause the third-party mass delivery service to provide the delivery state to the entity.

16. The non-transitory computer-readable storage medium of claim 13, wherein the instructions that cause the computer system to de-obscure the obscured data to obtain the plaintext data further cause the computer system to:
- identify an authorized service that can de-obscure the obscured data;
- transmit a request to the authorized service to de-obscure the obscured data, the request including the obscured data; and
- obtain the plaintext data from the authorized service.

17. The non-transitory computer-readable storage medium of claim 13, wherein:
- the obscured data includes a workflow data element comprising parameters for de-obscuring the obscured data, the parameters being unattainable by the third-party mass delivery service; and
- the instructions further cause the computer system to utilize the parameters to de-obscure the obscured data.

18. The non-transitory computer-readable storage medium of claim 13, wherein:
- the permissions specify a rate at which the entity is authorized to relay electronic messages; and
- the entity is authorized to relay the electronic message as a result of the entity not exceeding the rate by transmitting the electronic message.

19. The non-transitory computer-readable storage medium of claim 13, wherein:
- the permissions specify content that cannot be included in the electronic message; and
- the entity is authorized to relay the electronic message as a result of the electronic message not including the content.

20. The non-transitory computer-readable storage medium of claim 13, wherein the instructions that cause the computer system to de-obscure the obscured data to obtain the plaintext data further cause the computer system to:
- evaluate metadata of the obscured data to identify a cryptographic algorithm for de-obscuring the obscured data; and
- execute the cryptographic algorithm to de-obscure the obscured data.

* * * * *